United States Patent [19]

Barker et al.

[11] Patent Number: 5,007,613
[45] Date of Patent: Apr. 16, 1991

[54] VALVE AND ACTUATOR APPARATUS ALLOWING MULTIPOSITION RELATIONSHIP

[75] Inventors: James E. Barker, Sauk Rapids; Timothy J. Cash, Little Falls, both of Minn.

[73] Assignee: General Signal Corporation, Stamford, Conn.

[21] Appl. No.: 569,687

[22] Filed: Aug. 20, 1990

[51] Int. Cl.$^5$ .......................... F16K 5/00; F16K 31/16
[52] U.S. Cl. .......................................... 251/58; 74/522; 137/270; 251/305
[58] Field of Search ................... 137/270; 251/58, 305; 74/102, 522

[56] References Cited
U.S. PATENT DOCUMENTS

3,610,568 10/1971 Duwe ..................................... 251/58
4,765,589 8/1988 Sauze ................................ 251/58 X Primary Examiner—Gerald A. Michalsky
Attorney, Agent, or Firm—Harold Huberfeld; Milton E. Kleiman; Robert S. Smith

[57] ABSTRACT

An assembly which includes a linkarm joining a valve having a rotatable mounted first shaft on which a butterfly is mounted and a actuator having a second shaft which reciprocally moves in a linear path. The linkarm includes a plate having first and second apparatus for engaging the first shaft and first and second apparatus for engaging the second shaft. The first and second apparatus for engaging the first shaft includes apparatus limiting engagement between the first shaft and the first and second apparatus for engaging the first shaft to specific angular positions. The specific angular positions are rotated with respect to each other in some embodiments.

30 Claims, 7 Drawing Sheets

FIG. 17

VALVE AND ACTUATOR APPARATUS ALLOWING MULTIPOSITION RELATIONSHIP

BACKGROUND OF THE INVENTION

The invention relates to valve and actuator assemblies and particularly to assemblies permitting a plurality of angular relationships between the actuator and the valve. The ability to install the actuator at a plurality of angular relationships is of great significance because it allows the end user of the assembly to install the same valve and actuator combination in a variety of relative positions and thus avoid physical interference with structure that may otherwise interfere and which is not readily moved. This ability is also of great significance for the manufacturer or distributor of such assemblies because the requirements to manufacture and inventory a wide variety of different assemblies is drastically reduced.

It is conventional in the valve industry to provide most butterfly valves that rotate clockwise (as viewed from the drive end of the butterfly shaft) to close. The drive end will be understood to be the end of the shaft which is engaged by the actuator. Thus, it is important that any mechanism to connect the valve and actuator maintain the intended directional relationship.

A further consideration in constructing such valve and actuator assemblies is that the actuator is typically has a linear output. For example, the actuator may be pneumatically or hydraulically operated by pressure on a diaphragm to move a shaft axially. The shaft on which the butterfly is mounted traditionally has a crank arm extending radially from this shaft. Thus, the interconnection must be configured to adapt to these considerations.

It is an object of the invention to provide a plurality of possible positions for the actuator without affecting the direction of rotation of the valve butterfly when opening as well as when closing.

It is an object of the invention to provide apparatus which is inexpensive to manufacture and install.

Still another object of the invention is to provide apparatus which in one form of the invention allows positioning of the actuator in a plurality of angular positions that are 45 degrees apart and thus eight possible positions of the actuator are provided.

SUMMARY OF THE INVENTION

It has now been found that these and other objects of the invention may be attained in an assembly which includes a linkarm joining a valve having a rotatable mounted first shaft on which a butterfly is mounted and a actuator having a second shaft which reciprocally moves in a linear path. The linkarm includes a plate having first and second means for engaging the first shaft and first and second means for engaging the second shaft. The first and second menas for engaging the first shaft include means limiting engagement between the first shaft and the first and second means for engaging the first shaft to specific angular position. The specific angular positions are rotated an angle beta from each other.

In some forms of the invention the angle beta equals forty-five degrees. The distance from the center of the first means for engaging the first shaft to the center of the first means for engaging the second shaft may be equal to the distance from the second means for engaging the first shaft and the second means for engaging the second shaft. Some embodiments of the invention are constructed with the first and second means for engaging the first shaft including two square openings having a common center line and one of the openings is rotated 45 degrees with respect to the other.

In another embodiment of the invention the first and second means for engaging the first shaft includes two round holes each having a keyway therein, the keyways are disposed at an angle of 45 degrees therebetween.

In other embodiments of the invention the angle beta equals thirty degrees and the distance from the center of the first means for engaging the first shaft to the center of the first means for engaging the second shaft is equal to the distance from the second means for engaging the first shaft and the second means for engaging the second shaft. The first and second means for engaging the first shaft may include first and second hexagonal openings disposed on a common centerline and one is rotated thirty degrees with respect to the other.

In still other embodiments of the invention the first and second means for engaging the first shaft are not rotated with respect to each other. More particularly, the first and second means for engaging said first shaft may each include a planar side. In some embodiments the respective planar sides of said first and second means for engaging said first shaft are parallel.

These embodiments may have the distance from the center of the first means for engaging said first shaft to the center of said first means for engaging said second shaft is equal to the distance from said second means for engaging the first shaft and the second means for engaging the second shaft. The first and second means for engaging the first shaft may include two square openings having a common center line.

Some embodiments may have said first and second means for engaging the first shaft that includes two round holes each having first and second keyways therein disposed at an angle of 45 degrees therebetween. The respective first keyways may be disposed in parallel relationship.

BRIEF DESCRIPTION OF THE DRAWING

The invention will be better understood by reference to the accompanying drawing in which.

DESCRIPTION OF THE PREFERRED EMBODIMENT

Referring now to FIGS. 1-10 there is shown a valve and actuator assembly 10 in accordance with one form of the invention. The valve and actuator assembly 10 include an actuator assembly 12 and a valve assembly 14 that are joined by a coupling assembly 16 that includes a plate on which the actuator assembly 12 is carried. The valve assembly 14 includes a valve body 18 having a bore 23 extending generally diametrically through a generally cylindrical passageway 18b. The bore 23 receives a shaft 22 on which is carried a butterfly or valve disc 24. More particularly, the shaft 22 includes a plurality of threaded bores 22a disposed in aligned relationship with a plurality of recesses 24a for receiving respective bolts to secure the butterfly or valve disc 24 to the shaft 22.

Figure 1:
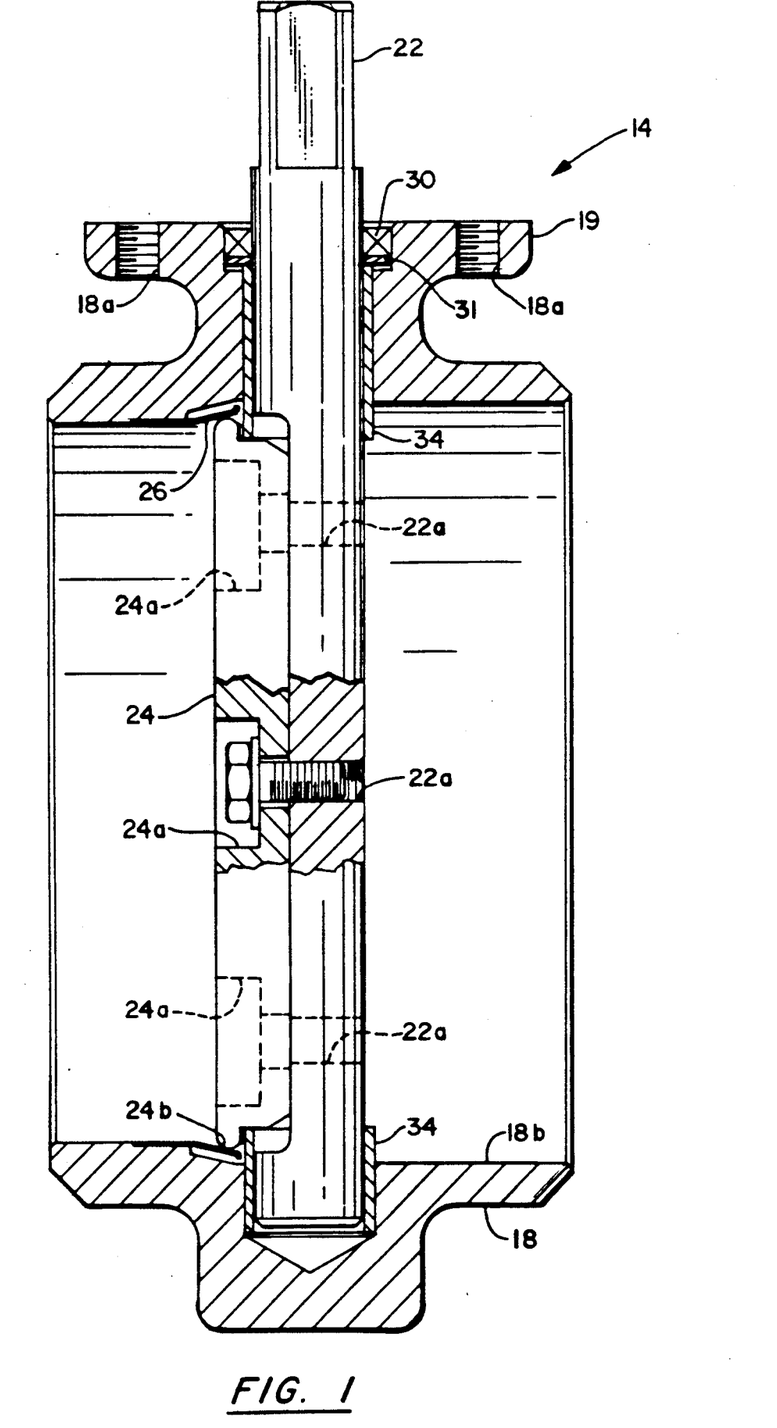
FIG. 1 is a partially schematic side elevational view in partial section of a valve assembly in accordance with one form of the invention.
Figure 2:
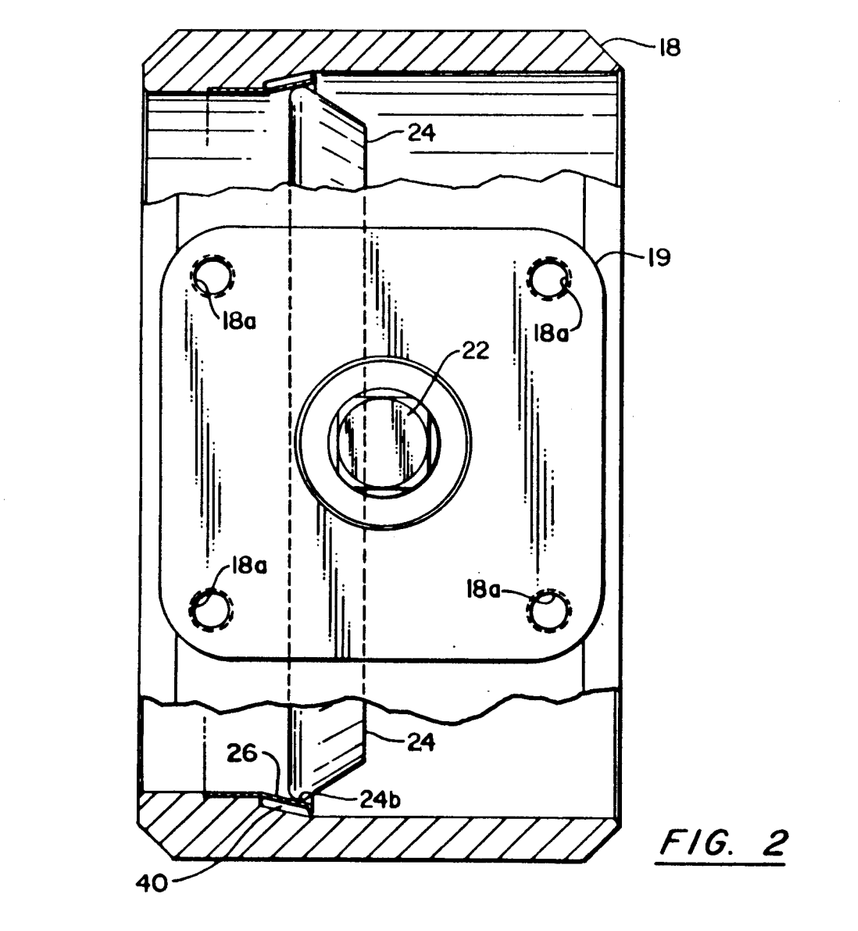
FIG. 2 is a partially schematic plan view of the valve shown in FIG. 1.

It will be seen that the valve is an offset or off center type butterfly valve in which the geometric center of the butterfly or valve disc 24 is not coincident with centerline of the shaft 22. The valve disc periphery 24b that bears against the flexible metallic seal 26 is spaced from the shaft 22.

The valve assembly 14 also includes bushings 34, 34 carried within the valve body 18, that carry the shaft 22 for rotational movement. A flexible graphite ring 30 is disposed around the shaft 22 within the bore 23. A washer 31 is disposed between the flexible graphite ring 30 and the valve body 18.

An actuator mounting flange 19 is provided on the valve body 18. The actuator mounting flange 19 includes threaded bores 18a for accommodating the actuator.

Figures 5, 6, 7:
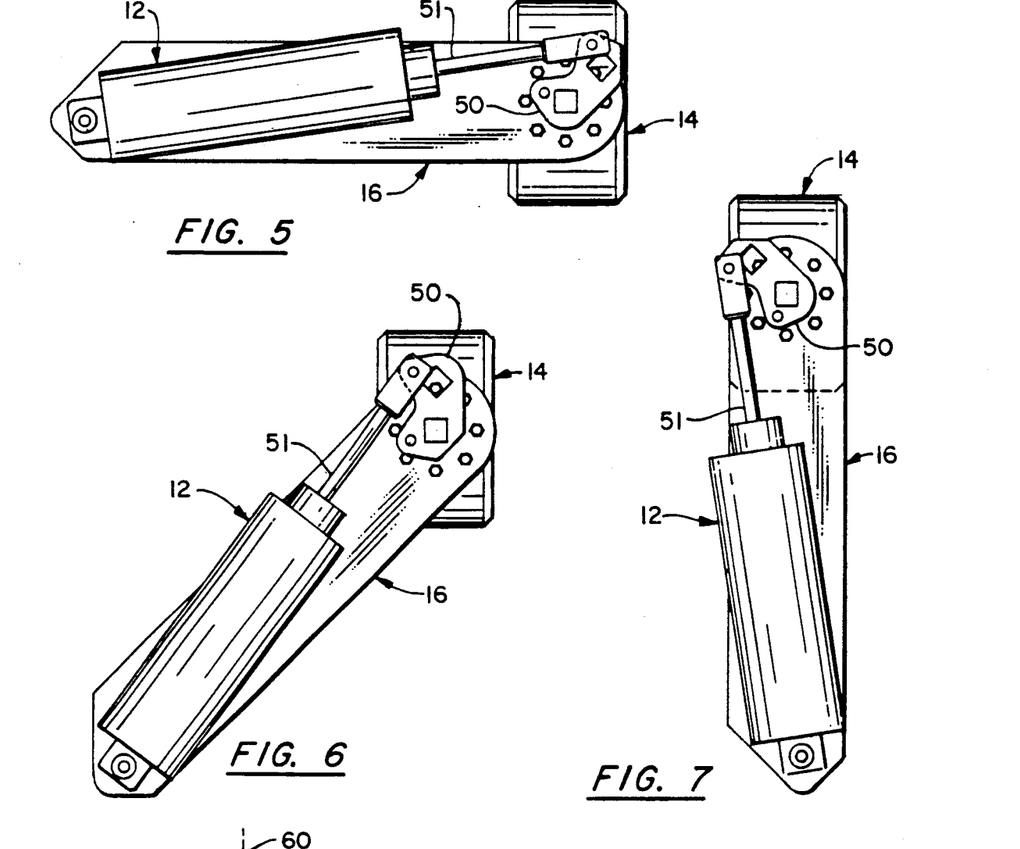
FIGS. 5, 6, and 7 are plan views showing three different angular relationship between the valve and actuator.

As best seen in FIGS. 5, 6 and 7 the actuator assembly 12 may be installed at 45 degree increments around the shaft 22. Thus, the same valve and actuator assembly may be installed in many different environments despite the presence of potentially interfering apparatus. The key to being able to connect actuator assembly 12 and valve assembly 14 together at a large number of relative angular positions is a linkarm 50. It will be understood that the linkarm 50 permits mounting at 45 degree increments with a single linkarm 50 even though only three such positions are shown in FIGS. 5, 6 and 7.

Figure 3:
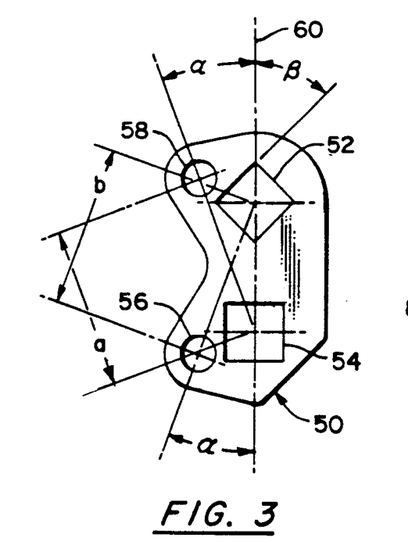
FIG. 3 is a plan view of the plate connecting the valve and actuator.
Figure 4:
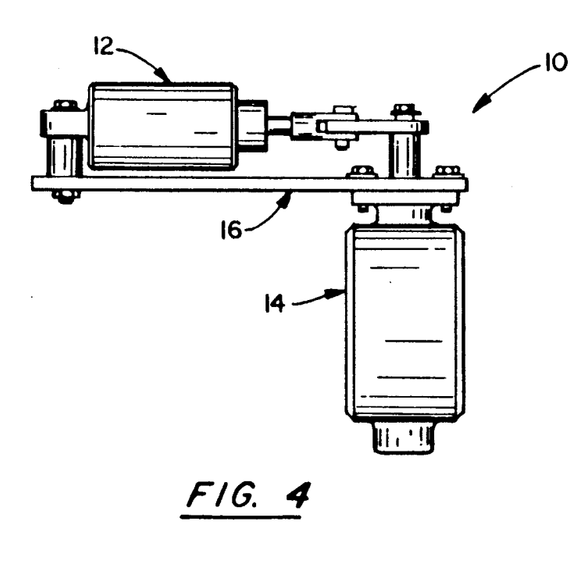
FIG. 4 is a partially schematic view of a valve and actuator assembly incorporating the valve assembly shown in FIG. 1.

Referring particularly now to FIG. 3, there is shwon a first embodiment of a linkarm 50 in accordance with one form of the invention. The linkarm 50 is generally planar as best seen in FIG. 4. Disposed in the linkarm 50 is a first square hole 52 for cooperation with the valve shaft 22 and a second square hole 54 for cooperation with the valve shaft 22. In this particularly embodiment of the invention the linkarm 50 is intended for cooperation with a shaft 22 having a square cross-section and this mandates the shape of first square hole 52 for cooperation with the valve shaft 22 and second square hole 54 for cooperation with the valve shaft 22.

The linkarm 50 also includes a first round hole 56 for cooperation with the actuator shaft 51 and a second round hole 58 for cooperation with the actuator shaft 51. At any one time the first square hole 52 for cooperation with the valve shaft 22 and first round hole 56 for cooperation with the actuator shaft 51 may be utilized. Alternatively, the second square hole 54 for cooperation with the valve shaft 22 and the second round hole 58 for cooperation with the actuator shaft 51 may be utilized. It will be further understood that the linkarm 50 will be inverted in the alternative arrangement. This embodiment allows eight possible angular orientations of the actuator assembly 12 relative to the valve assembly 14. More particularly, the square shape of the holes 52, 54 each make possible four different positions.

The linkarm 50 has certain linear dimensions and angular relationships to attain this result. More particularly the dimension a is equal to the dimension b in the preferred embodiment. More particularly, the dimension (1) from the center of the second round hole 58 for cooperation with the actuator shaft 51 to the center of the second square hole 54 for cooperation with the valve shaft 22 is equal the dimension (2) from the center of the first square hole 52 for cooperation with the valve shaft 22 to the center of first round hole 56 for cooperation with the actuator shaft 51. Thus, the effective or operative length of the crank arm is the same when the linkarm 50 is installed with either combination of holes.

A centerline 60 extends through first square hole 52 for cooperation with the valve shaft 22 and second square hole 54 for cooperation with the valve shaft 22. The first square hole 52 for cooperation with the valve shaft 22 is rotated 45 degrees with respect to the second square hole 54 for cooperation with the valve shaft 22. Thus, the side of the first square hole 52 for cooperation with the valve shaft 22 is disposed at a 45 degree angle to the centerline 60. The linkarm 50 has an angle beta between the centerline 60 and one of the sides of the square hole 52. The angle beta is equal to 45 degrees in this embodiment.

In all embodiments having two holes for engaging the valve shaft 22 and two holes for cooperation with shaft 51 of the actuator assembly 12 the angle alpha must be the same on both ends of the linkarm. In other words, the angle between (1) a line extending through the center of the hole cooperating with the actuator and the center of the hole cooperating with the valve and (2) centerline of the holes for alternative engagement with the valve must be the same on both ends of the linkarm. This geometric relationship is required in all embodiments of the invention having two holes for cooperation with the valve and two holes for cooperation with the actuator.

The linkarm 50 is characterized by an angle alpha that is equal to twenty degrees, 4 minutes between the centerline 60 and a line extending through the center of the first square hole 52 for cooperation with the valve shaft 22 and the center of first round hole 56 for cooperation with the actuator shaft 51. Similarly the same angle is between the centerline 60 and a line extending through a line extending through the center of the second square hole 54 for cooperation with the valve shaft 22 and the center of the second round hole 58 for cooperation with the actuator shaft 51.

The linkarm 50 includes a linear edge 50a that is aligned with the valve body 18 in one relative position of the valve and actuator assembly 10.

Figure 8:
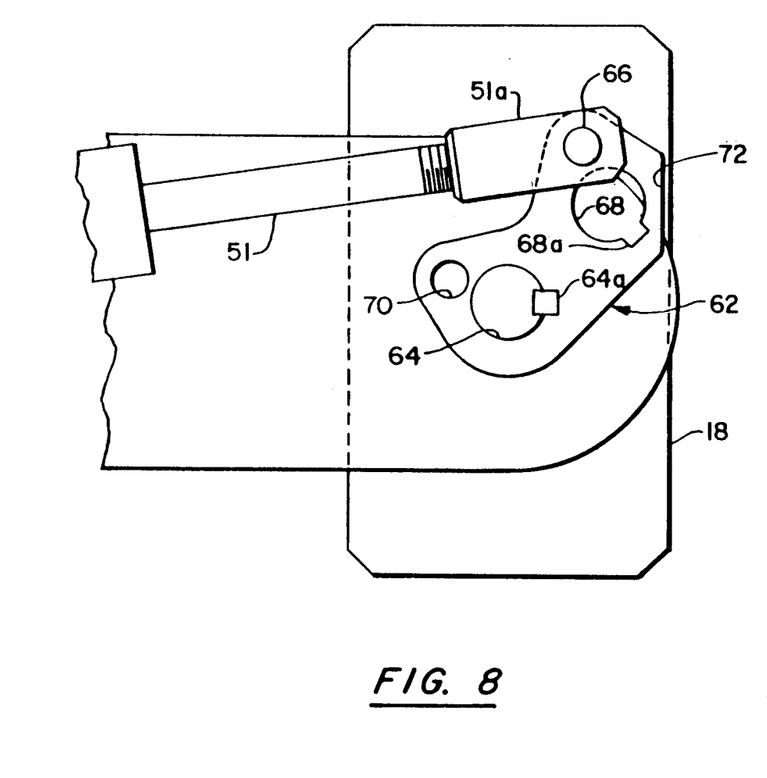
FIGS. 8 and 9 are plan views showing a linkarm embodiment of the invention having round holes with keyways for engaging the valve shaft.
Figure 9:
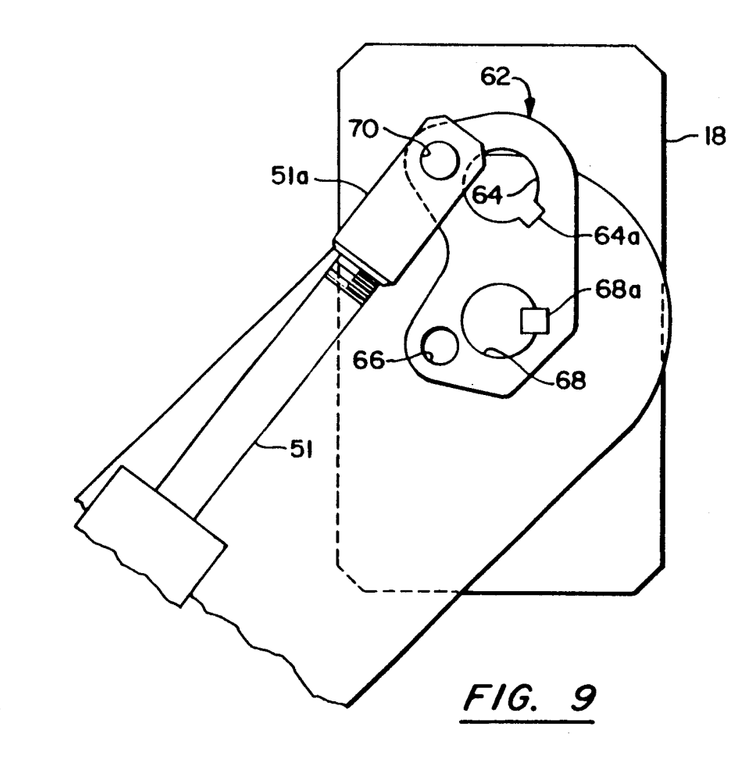

Another embodiment of the invention is shown in FIGS. 8 and 9. This embodiment includes a linkarm 62 having a first round hole 64 for cooperation with the valve shaft 22 and a first round hole 66 for cooperation with the actuator shaft 51. The linkarm 62 also includes a second round hole 68 for cooperation with the valve shaft 22 and a second round hole 70 for cooperation with the actuator shaft 51. (The shaft 51 is coupled to the hole 70 by a clevis 51a.) The first round hole 64 for cooperation with the valve shaft 22 includes a keyway 64a and in a similar manner the second round hole 68 for cooperation with the valve shaft 22 includes a keyway 68a. The keyway 68a is rotated 45 degrees from the keyway 64a. The angles and linear dimensions of linkarm 62 are generally similar to the linkarm 50. This embodiment allows two possible angular orientations of the actuator assembly 12 relative to the valve assembly 14.

Figure 10:
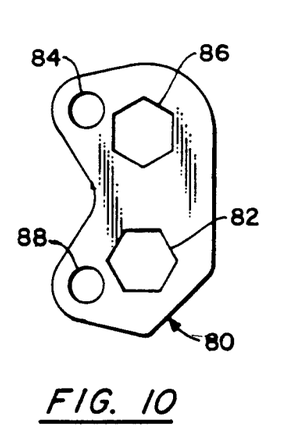
FIG. 10 is a plan view showing another linkarm embodiment of the invention utilizing hexagonal holes for engaging the valve shaft.

Still another embodiment of the invention is shown in FIG. 10 in which a linkarm 80 includes a first hexagonal hole 82 for cooperation with the valve shaft 22 and a first round hole 84 for cooperation with the actuator shaft 51. The linkarm 80 also includes a second hexagonal hole 86 for cooperation with the valve shaft 22 and a second round hole 88 for cooperation with the actuator shaft 51. In this embodiment of the invention the second hexagonal hole 86 for cooperation with the valve shaft 22 is rotated thirty degrees with respect to the first hexagonal hole 82a for cooperation with the valve shaft 22.

This embodiment of the invention allows relative positioning of the actuator assembly 12 and the valve assembly 14 at thirty degree angular increments. As in the other embodiments the distance between the center of first hexagonal hole 82 for cooperation with the valve shaft 22 and the center of first round hole 84 for cooperation with the actuator shaft 51 is equal to the distance between the center of second hexagonal hole 86 for cooperation with the valve shaft 22 and the center of second round hole 88 for cooperation with the actuator shaft 51. The angular relationships necessary to achieve the thirty degree incremental result will be apparent to those skilled in the art. This embodiment allows twelve possible angular orientations of the actuator assembly 12 relative to the valve assembly 14. More particularly, the hexagonal shape of the holes 82, 86 each make possible six different positions.

Figure 11:
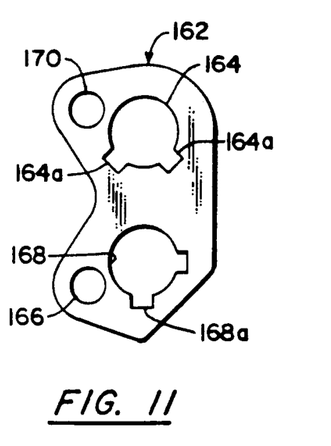
FIG. 11 is a plan view of another linkarm embodiment, similar to the embodiment of FIGS. 8 and 9, that has two keyways in each hole for engaging the valve shaft.

The embodiment of the invention shown if FIG. 11 will be understood to be similar to the embodiment of FIGS. 8 and 9. More particularly, this embodiment includes a linkarm 162 having a first round hole 164 for cooperation with the valve shaft 22 and a first round hole 166 for cooperation with the actuator shaft 51. The linkarm 162 also includes a second round hole 168 for cooperation with the valve shaft 22 and a second round hole 170 for cooperation with the actuator shaft 51. The first round hole 164 for cooperation with the valve shaft 22 includes a first and second keyways 164a (disposed at 90 degree increments about the hole 164) and in a similar manner the second round hole 168 for cooperation with the valve shaft 22 includes first and second keyways 168a (disposed at 90 degree increments about the hole 164). The first keyway 168a is rotated 45 degrees from the first keyway 164a. This embodiment allows four possible angular orientations of the actuator assembly 12 relative to the valve assembly 14.

Those skilled in the art will recognize that the angles and linear dimensions of the linkarms 62, 50, 80, and 162 are generally similar to the linkarm 50.

Figure 12:
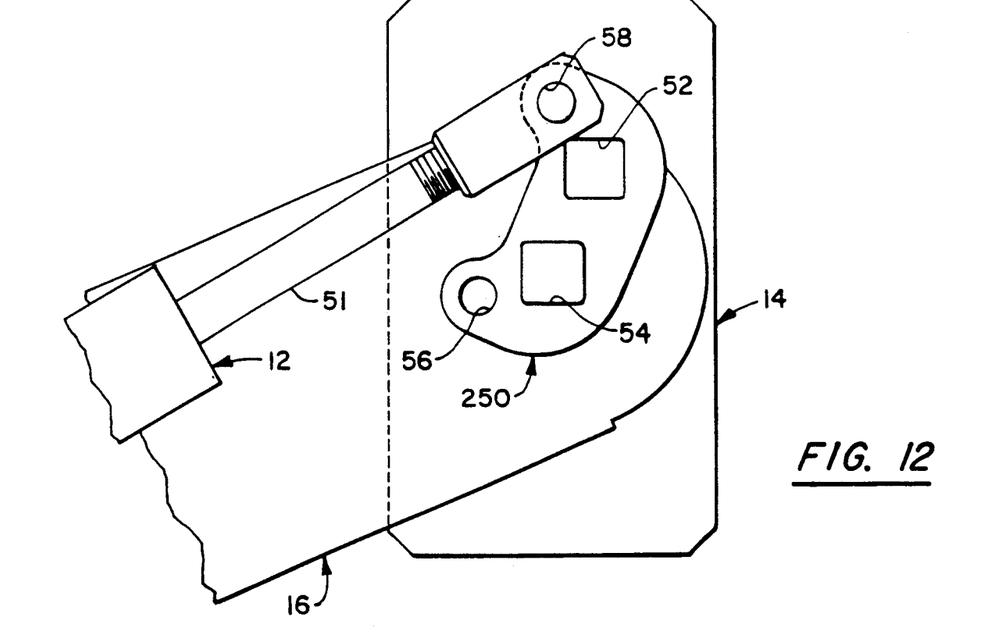
FIGS. 12 and 13 are plan views showing a linkarm embodiment of the invention having aligned square holes for engaging the valve shaft.
Figure 13:
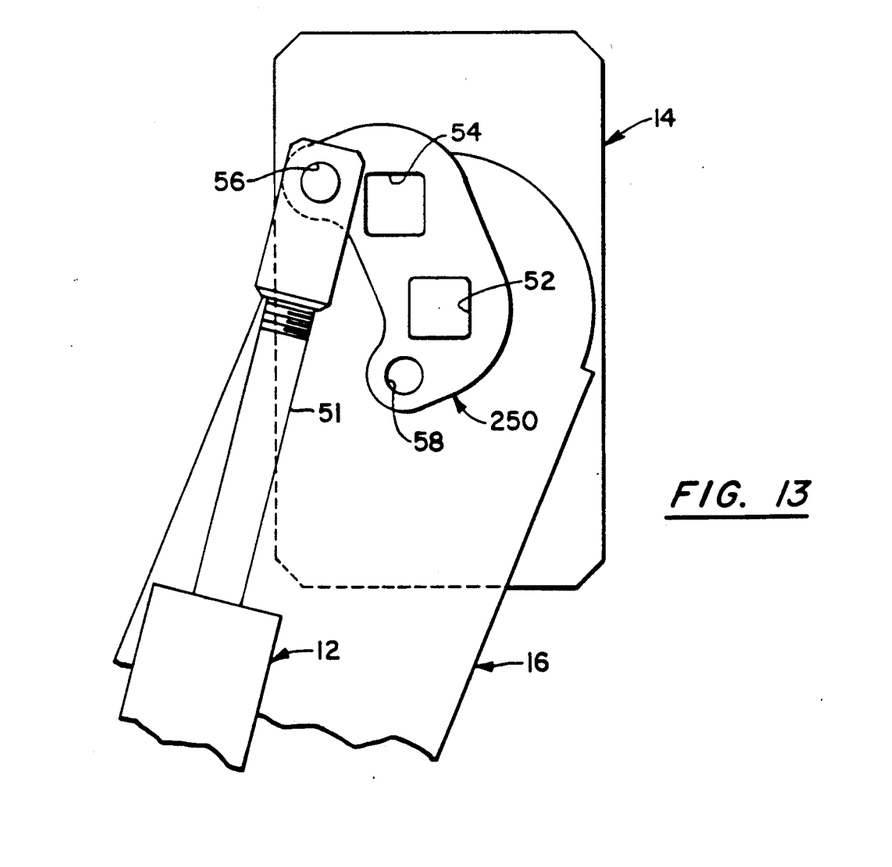

Referring to FIGS. 12 and 13 there are shown plan views of a a linkarm 250 embodiment of the invention having aligned square holes 54, 56 for engaging the valve shaft. The sides of the holes 52, 54 are disposed in aligned relationship. Advantageously, the holes 52, 54 have at least one side that is disposed at an angle of 22.5 degrees with respect to a centerline (not shown) for the holes 52, 54. This centerline corresponds to the line 60 shown in FIG. 3.

Figure 14:
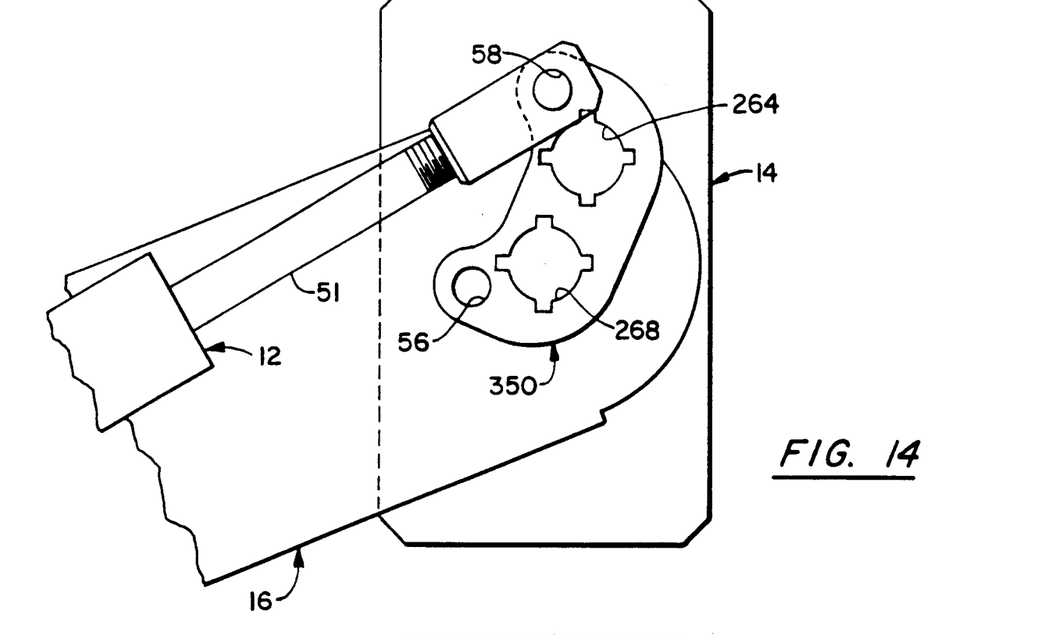
FIGS. 14 and 15 are plan views showing a linkarm embodiment of the invention having round holes with four aligned keyways for engaging the valve shaft.
Figure 15:
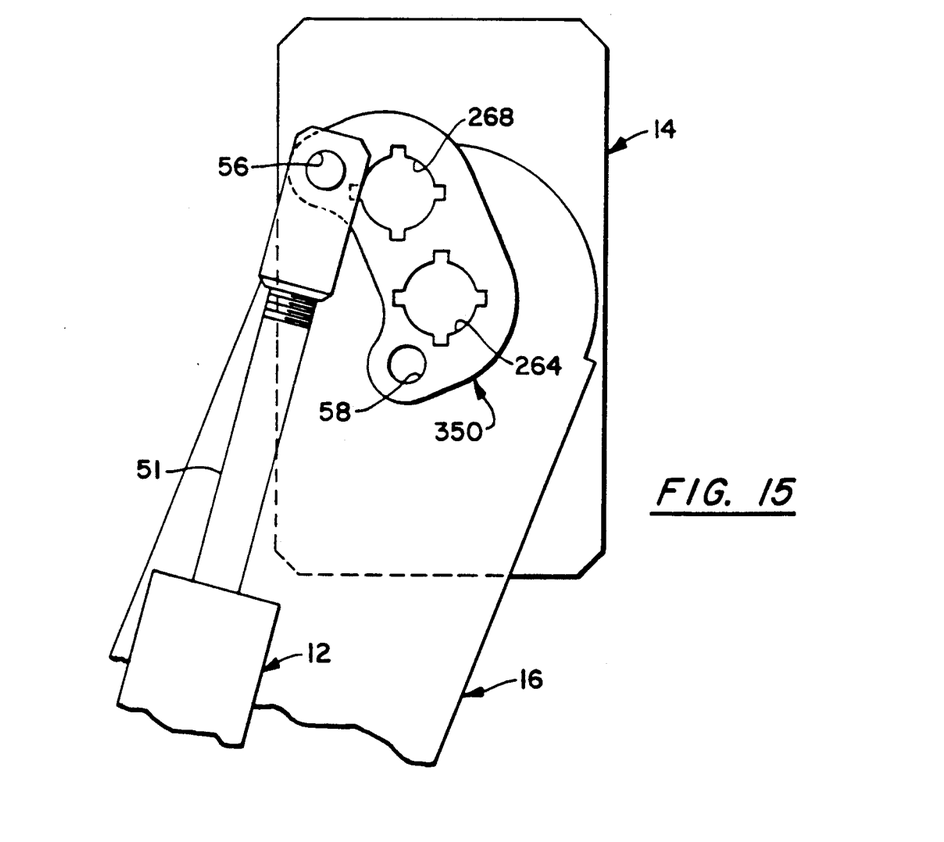

Similarly, FIGS. 14 and 15 are plan views showing a linkarm 350 embodiment of the invention having round holes 264, 268 with four aligned keyways for engaging the valve shaft. Advantageously, one of the keyways is disposed is also disposed at an angle of 22.5 degrees with respect to the centerline referred to above.

Figure 16:
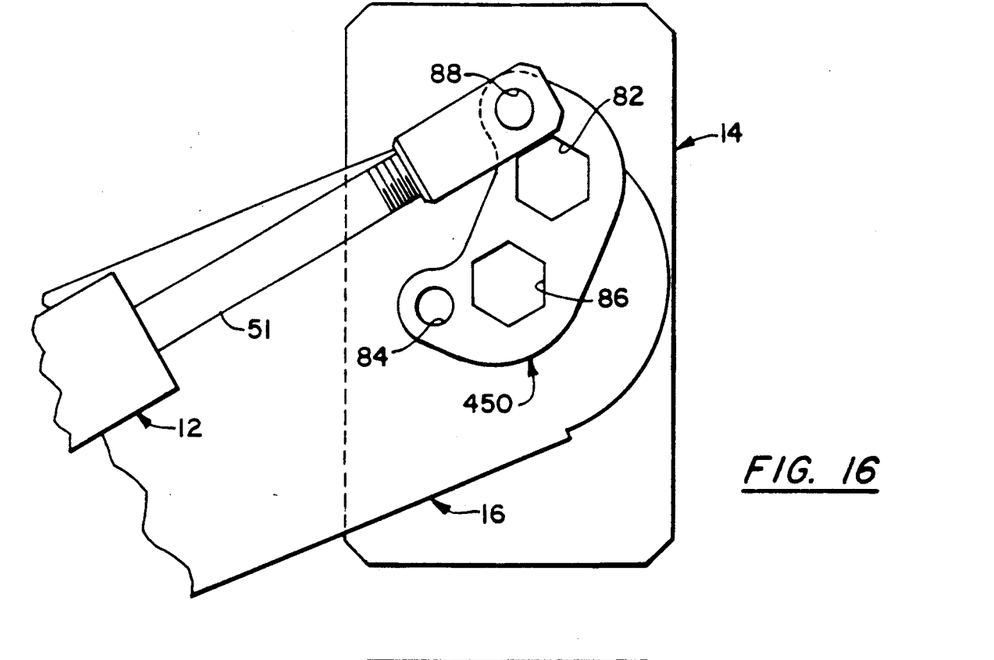
FIGS. 16 and 17 are plan views showing a linkarm embodiment of the invention having aligned hexagonal holes for engaging the valve shaft.
Figure 17:
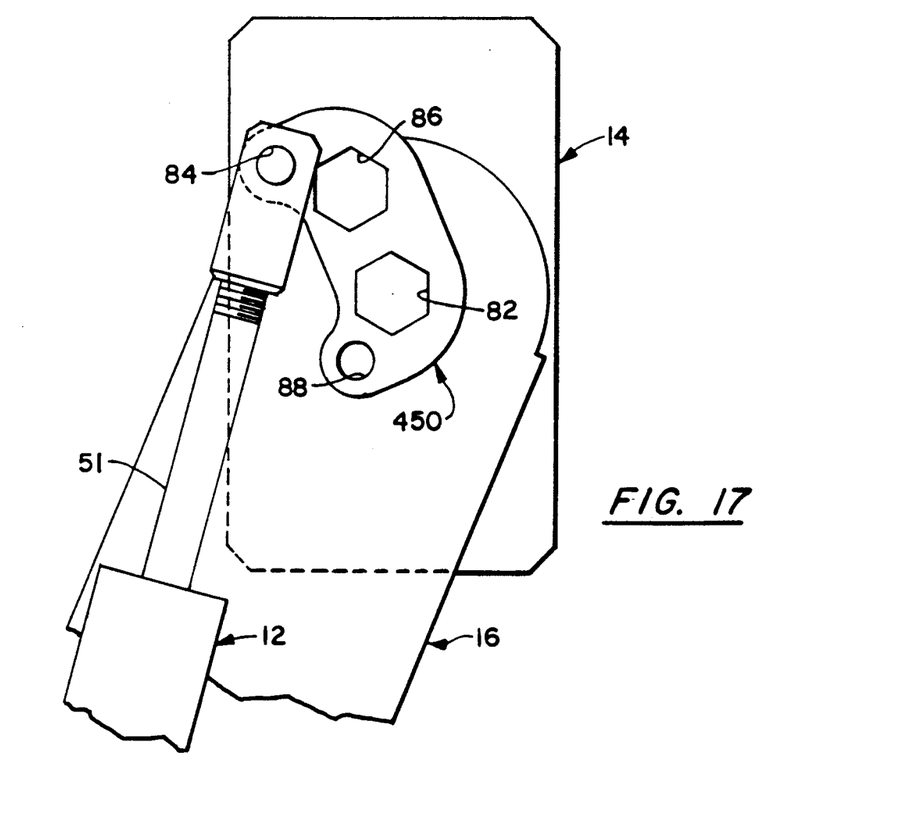

In a similar manner FIGS. 16 and 17 are plan views showing a linkarm 450 embodiment of the invention having aligned hexagonal holes 82, 86 for engaging the valve shaft. More particularly, it is preferred that one side of each hexagonal opening is disposed at an angle of 22.5 degrees with respect to the centerline of the holes 82, 86.

Those skilled in the art will recognize that the number of holes in the plate of the coupling assembly 16 must be related to the possible positions as constrained by the specific linkarm utilized. referring expressly to FIGS. 5-7 it will be seen that it is essential that (1) the linkarm facilitate the various angular relationships between the shaft 51 and the shaft 22 of the valve assembly 14 and in addition (2) the bolts joining the plate to the valve assembly 14 must be sufficient in number to allow assembly at the desired angular relationship.

Although the multiposition arrangement has been shown and described with respect to the valve assembly 12 it will be understood that any of many other valve assemblies may alternatively be utilized.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A linkarm apparatus for joining an associated valve having a rotatable mounted first shaft on which a butterfly is mounted and an associated actuator having a second shaft which reciprocally moves in a linear path, said apparatus including:
    a plate having first and second means for engaging the first shaft and first and second means for engaging the second shaft, said first and second means for engaging the first shaft including means limiting engagement between said first shaft and said first and second means for engaging the first shaft to specific angular positions, said specific angular positions being rotated an angle beta from each other.

2. The apparatus as described in claim 1 wherein:
   said angle beta equals forty-five degrees.

3. The apparatus as described in claim 2 wherein:
   the distance from the center of said first means for engaging said first shaft to the center of said first means for engaging said second shaft is equal to the distance from said second means for engaging the first shaft and the second means for engaging the second shaft.

4. The apparatus as described in claim 3 wherein:
   said first and second means for engaging the first shaft includes two square openings having a common center line and one of said openings is rotated 45 degrees with respect to the other.

5. The apparatus as described in claim 3 wherein:
said first and second means for engaging the first shaft includes two round holes each having a keyway therein, said keyways being disposed at an angle of 45 degrees therebetween.

6. The apparatus as described in claim 1 wherein:
said angle beta equals thirty degrees.

7. The apparatus as described in claim 6 wherein:
the distance from the center of said first means for engaging said first shaft to the center of said first means for engaging said second shaft is equal to the distance from said second means for engaging the first shaft and the second means for engaging the second shaft.

8. The apparatus as described in claim 7 wherein:
said first and second means for engaging the first shaft includes first and second hexagonal openings disposed on a common centerline and one is rotated thirty degrees with respect to the other.

9. A valve, actuator and linkarm apparatus which comprises:
a valve having a rotatable mounted first shaft on which a butterfly is mounted;
an actuator having a second shaft which reciprocally moves in a linear path;
a plate having first and second means for engaging the first shaft of the valve and first and second means for engaging the second shaft, said first and second means for engaging the first shaft including means limiting engagement between said first shaft and said first and second means for engaging the first shaft to specific angular positions, said specific angular positions being rotated an angle beta from each other.

10. The apparatus as described in claim 9 wherein:
said angle beta equals forty-five degrees.

11. The apparatus as described in claim 10 wherein:
the distance from the center of said first means for engaging said first shaft to the center of said first means for engaging said second shaft is equal to the distance from said second means for engaging the first shaft and the second means for engaging the second shaft.

12. The apparatus as described in claim 11 wherein:
said first and second means for engaging the first shaft includes two square openings having a common center line and one of said openings is rotated 45 degrees with respect to the other.

13. The apparatus as described in claim 12 wherein:
said first and second means for engaging the first shaft includes
two round holes each having a keyway therein, said keyways being disposed at an angle of 45 degrees therebetween.

14. The apparatus as described in claim 9 wherein:
said angle beta equals thirty degrees.

15. The apparatus as described in claim 9 wherein:
the distance from the center of said first means for engaging said first shaft to the center of said first means for engaging said second shaft is equal to the distance from said second means for engaging the first shaft and the second means for engaging the second shaft.

16. The apparatus as described in claim 15 wherein:
said first and second means for engaging the first shaft includes first and second hexagonal openings disposed on a common centerline and one is rotated thirty degrees with respect to the other.

17. A linkarm apparatus for joining an associated valve having a rotatable mounted first shaft on which a butterfly is mounted and an associated actuator having a second shaft which reciprocally moves in a linear path, said apparatus including:
a plate having first and second means for engaging the first shaft and first and second means for engaging the second shaft, said first and second means for engaging the first shaft including means limiting engagement between said first shaft and said first and second means for engaging the first shaft to specific angular positions.

18. The apparatus as described in claim 17 wherein:
said first and second means for engaging said first shaft each include a planar side.

19. The apparatus as described in claim 18 wherein:
said respective planar sides of said first and second means for engaging said first shaft are parallel.

20. The apparatus as described in claim 19 wherein:
the distance from the center of said first means for engaging said first shaft to the center of said first means for engaging said second shaft is equal to the distance from said second means for engaging the first shaft and the second means for engaging the second shaft.

21. The apparatus as described in claim 20 wherein:
said first and second means for engaging the first shaft includes two square openings having a common center line.

22. The apparatus as described in claim 16 wherein:
said first and second means for engaging the first shaft includes two round holes each having first and second keyways therein disposed at an angle of 45 degrees therebetween.

23. The apparatus as described in claim 16 wherein:
said first and second means for engaging the first shaft includes
two round holes each having a keyway therein, said keyways being disposed in parallel relationship.

24. A linkarm apparatus for joining an associated valve having a rotatable mounted first shaft on which a butterfly is mounted and an associated actuator having a second shaft which reciprocally moves in a linear path, said apparatus including:
a plate having first and second means for engaging the first shaft and first and second means for engaging the second shaft, said first and second means for engaging the first shaft including means limiting engagement between said first shaft and said first and second means for engaging the first shaft to specific angular positions, said means limiting engagement allowing engagement at an angle of 22.5 degrees with respect to a centerline of the first and second means for engaging the first shaft.

25. The apparatus as described in claim 24 wherein:
said means limiting engagement include a planar side on said first and second means for engaging said first shaft.

26. The apparatus as described in claim 25 wherein:
said respective planar sides of said first and second means for engaging said first shaft are parallel.

27. The apparatus as described in claim 26 wherein:
the distance from the center of said first means for engaging said first shaft to the center of said first means for engaging said second shaft is equal to the distance from said second means for engaging the first shaft and the second means for engaging the second shaft.

28. The apparatus as described in claim 27 wherein: said first and second means for engaging the first shaft includes two square openings having a common center line.

29. The apparatus as described in claim 24 wherein: said first and second means for engaging the first shaft includes two round holes each having first and second keyways therein disposed at an angle of 45 degrees therebetween.

30. The apparatus as described in claim 24 wherein: said first and second means for engaging the first shaft includes
two round holes each having a keyway therein, said keyways being disposed in parallel relationship.

* * * * *